(12) United States Patent
Charbon et al.

(10) Patent No.: US 7,501,628 B2
(45) Date of Patent: Mar. 10, 2009

(54) TRANSDUCER FOR READING INFORMATION STORED ON AN OPTICAL RECORD CARRIER, SINGLE PHOTON DETECTOR BASED STORAGE SYSTEM AND METHOD FOR READING DATA FROM AN OPTICAL RECORD CARRIER

(75) Inventors: Edoardo Charbon, Echandens (CH); Cristiano Niclass, Clarens (CH)

(73) Assignee: Ecole Polytechnique Federale de Lausanne EPFL, Lausanne (CH)

( * ) Notice: Subject to any disclaimer, the term of this patent is extended or adjusted under 35 U.S.C. 154(b) by 385 days.

(21) Appl. No.: 11/353,245

(22) Filed: Feb. 14, 2006

(65) Prior Publication Data

US 2006/0202121 A1 Sep. 14, 2006

Related U.S. Application Data

(60) Provisional application No. 60/652,010, filed on Feb. 14, 2005.

(30) Foreign Application Priority Data

Feb. 14, 2005 (EP) ................... 05101069

(51) Int. Cl.
*H01L 27/14* (2006.01)
(52) U.S. Cl. ............... 250/338.4; 250/370.09
(58) Field of Classification Search ......... 250/338.4, 250/370.09
See application file for complete search history.

(56) References Cited

U.S. PATENT DOCUMENTS

| | | | | |
|---|---|---|---|---|
| 4,303,861 | A | 12/1981 | Ekstrom | 250/370.14 |
| 4,710,817 | A | 12/1987 | Ando | 348/310 |
| 5,619,040 | A * | 4/1997 | Shapiro et al. | 250/370.09 |
| 5,784,352 | A * | 7/1998 | Swanson et al. | 369/94 |
| 5,892,575 | A | 4/1999 | Marino | |
| 6,300,612 | B1 | 10/2001 | Yu | |
| 6,376,321 | B1 | 4/2002 | Popovic et al. | |
| 6,392,282 | B1 | 5/2002 | Sahara et al. | |
| 6,563,185 | B2 | 5/2003 | Moddel et al. | |
| 6,693,311 | B2 | 2/2004 | Guenter et al. | |
| 6,720,588 | B2 * | 4/2004 | Vickers | 257/186 |
| 6,720,589 | B1 * | 4/2004 | Shields | 257/194 |
| 6,741,341 | B2 | 5/2004 | DeFlumere | 356/141.1 |

(Continued)

FOREIGN PATENT DOCUMENTS

EP 1191598 3/2002

OTHER PUBLICATIONS

Edwin P. Walker et al., "Two-photon Volumetric Optical Disk Storage Systems Experimental Results and Potentials" Call/Recall, Inc., Optics in Computing OCO3 Pa-OF B2, 3 pages.

(Continued)

*Primary Examiner*—David P Porta
*Assistant Examiner*—Djura Malevic
(74) *Attorney, Agent, or Firm*—Blank Rome LLP

(57) ABSTRACT

Transducer (24, 240, 241) for reading information stored in an optical record carrier (1), comprising at least one solid-state single photon detector, for example a single photon avalanche diode (24) for acquisition of a 2D or 3D image of at least a portion of the optical record carrier.

32 Claims, 3 Drawing Sheets

U.S. PATENT DOCUMENTS

| | | | |
|---|---|---|---|
| 6,914,314 | B2 | 7/2005 | Merrill et al. |
| 6,927,889 | B2 | 8/2005 | Schwarte |
| 7,012,738 | B1 | 3/2006 | Schwarte |
| 7,262,402 | B2 | 8/2007 | Niclass et al. |
| 2001/0020863 | A1* | 9/2001 | Cova et al. ............. 327/514 |
| 2001/0023944 | A1 | 9/2001 | Maruyama et al. |
| 2002/0024058 | A1 | 2/2002 | Marshall et al. |
| 2003/0164444 | A1 | 9/2003 | Yoneda et al. |
| 2004/0130702 | A1 | 7/2004 | Jupp et al. |
| 2004/0245592 | A1 | 12/2004 | Harmon ..................... 257/438 |
| 2004/0257962 | A1* | 12/2004 | Walker et al. .......... 369/112.23 |
| 2005/0012033 | A1 | 1/2005 | Stern et al. ................. 257/438 |
| 2005/0077539 | A1 | 4/2005 | Lipson |
| 2005/0087673 | A1 | 4/2005 | Chen et al. |
| 2006/0124832 | A1 | 6/2006 | Harmon et al. ......... 250/214 R |
| 2006/0175529 | A1 | 8/2006 | Harmon et al. ......... 250/214 R |
| 2006/0266926 | A1 | 11/2006 | Chuang et al. |

OTHER PUBLICATIONS

Yi Zang et al., "Numerical Aperture Influence on 3-D Multi-layer Optical Data Storage Systems" Call/Recall, Inc. and Genoptix Inc, 4 pages, ISOM/ODOS 2002, paper # TUP 28.

Edwin P. Walker et al., 3-D Parallel Readout in a 3-D Multi-layer Optical Data Storage System, Call/Recall, Inc. Genoptix, Inc. and Emcore Fiber Optics Components, 3 pages.

Jyh-Shin Pan et al., "A CMOS Multi-Format Read/WritesoC for 7x Blu-ray/16x DVD/56x CD" ISSCC 2005. Session 31, Mass Storage 31.3, pp. 572-573 and 618.

Rochas et al., First Passively-Quenched Single Photon Counting Avalanche Photodiode Element Integrated in a Conventional CMOS Process with 32ns Dead Time, Proceedings of the SPIE, 4833, No. 22, 9 pages, 2002.

Niclass et al., A CMOS Single Photon Avalanche Diode Array for 3D Imaging, ISSCC, 2004, Session 6, Imaging, 6.7, 2004, 10 pages.

Rochas et al., First Fully Integrated 2-D Array of Single-Photon Detectors in Standard CMOS Technology, IEEE Photonics Technology Letters, Jul. 2003, pp. 963-965, vol. 15, No. 7.

Rochas et al., Single Photon Detector Fabricated in a Complementary Metal-Oxide-Semiconductor High-Voltage Technology, Review of Scientific Instruments, Jul. 2003, pp. 3263-3270, vol. 74, No. 7.

Aull et al., Geiger-Mode Avalanche Photodiodes for Three-Dimensional Imaging, Lincoln Laboratory Journal, 2002, pp. 335-350, vol. 13, No. 2.

C. Niclass et al., "Design and Characterization of a CMOS 3-D Image Sensor Based on Single Photon Avalanche Diodes", IEEE Journal of Solid-State Circuits, pp. 1847-1854, Sep. 2005.

Jackson, J.C., Characterization of Large Area SPAD Detectors Operated in Avalance Photodiode Mode, 13$^{th}$ Annual Meeting, IEEE, vol. 1, Nov. 13-16, pp. 17-18.

Albota et al., Three-Dimensional Imaging Laser Radar with a Photon-Counting Avalance Photodiode Array and Microchip Laser, Applied Optics, Dec. 2002, vol. 41, No. 36.

Aull et al., Three-Dimensional Imaging with Arrays of Geiger-Mode Avalance Photodiodes, Semiconductor Photodetectors, Proceedings of SPIE, vol. 5353, 2004.

Zappa et al., Monolithic CMOS Detector Module for Photon Counting and Picosecond Timing, IEEE, Sep. 2004, pp. 341-344.

* cited by examiner

TRANSDUCER FOR READING INFORMATION STORED ON AN OPTICAL RECORD CARRIER, SINGLE PHOTON DETECTOR BASED STORAGE SYSTEM AND METHOD FOR READING DATA FROM AN OPTICAL RECORD CARRIER

The present application also incorporates by reference the content of U.S. utility patent application Ser. No. 11/290,831, filed on Dec. 1, 2005, Pub. No. 2006/0131480, and of U.S. provisional patent application U.S. 60/652,010, filed on Feb. 14, 2005.

The present application claims priority of EP patent application 2005EP-101069 (EP05101069.2), filed on Feb. 14, 2005, the content of which is hereby incorporated by reference.

DESCRIPTION OF RELATED ART

With the advent of cheap optical storage media and the availability of portable optical readers, Compact Disk Read Only Memories (CDROMS) and Digital Video Disks (DVDs) have become the technology of choice in many low-cost applications. Conventional photodiodes fabricated in Bipolar, CMOS, BiCMOS, and other technologies, have been adequate until now in terms of performance and cost. However recently, new media materials have been proposed for high capacity optical storage applications. These materials may trigger significant challenges to the optical read-out sensing system due to the increased bit density in x- and y- and, in some cases, z-dimension. In general, a significantly higher saturation and dynamic range, beyond the capability of conventional CMOS imagers are necessary. In addition, due to the increased capacity, a much higher read-out speed is also required. While photo-multiplying tubes may achieve high dynamic range, they may have insufficient read-out speed and too low saturation. Moreover, such devices are generally not cost-effective. CMOS SPDs are devices capable of generating an electrical pulse for an incident photon several million times a second due to a reduced detection cycle. Due to this peculiarity, CMOS SPDs generally exhibit very high saturation intensities if compared to CMOS Active Pixel Sensors. CMOS SPDs also exhibit a very small reaction time to incoming photons, thus enabling very high precision in discriminating variable reflectance, fluorescence, or other types of optical characteristics used in materials for storage applications. In addition, low cost and compatibility with conventional CMOS digital technology makes CMOS SPDs the Ideal technology for future and emerging optical storage applications.

A number of storage devices have recently appeared based on the Blu-ray (BD) format. Up till now, the largest capacity achieved on CD-size dual-layer BD storage media is 46.6 to 54 GB. Read-out speeds equivalent to 7×BD at chip level have been recently demonstrated by employing a 405 nm laser and an objective lens with a numerical aperture of 0.85. While BD storage media capable of supporting eight layers with a maximum capacity of 200 GB are being investigated today, the industry is increasingly approaching radically different solutions. Two-photon volumetric optical disk based storage systems are one of such examples as described by E. P. Walker, Y. Zhang, A. Dvornikov, P. Rentzepis and S. Esener in "Two-Photon Volumetric Optical Disk Storage Systems Experimental Results and Potentials" and ISOM/ODS meeting 2002. In this kind of medium, data are recorded in concentric tracks and through multiple layers in depth. A bit is recorded by focusing a beam of light in a specific 3D location of a molded photochromic dispersed organic polymer. Bits are read by occurring fluorescence when photons are absorbed in the corresponding volume. FIG. 1 shows a truncated view of such an optical record carrier 1 and an illustration of the recorded bits 100, spread across layers 11 as they appear after stimulation. In a typical embodiment, the bits may be coded in spatial locations with a length of about 10 µm and a width of about 1 µm. In the above-mentioned article of E. P Walker et al., a 0.5×0.5×4.5 µm$^3$ bit was demonstrated over 100 layers. Y. Zhang et al. describes this structure in more details in "Numerical aperture influence on 3-D multilayer optical data storage systems" ISOM/ODS meeting (2002) paper #TUP 28.

A suitable electro-optical setup for recording and reading individual bits is shown in FIG. 2. A motor 20 drives an optical record carrier 1. During recording, a light beam is focused on selected locations 100 of the carrier using optic 21, 22, 23. While reading, a light source emits a light beam focusing on the read portion of the disc using optic 27, 28; the fluorescence light emitted by the stimulated locations is focused through optic 28, 27, 26 on the transducer 25 where a photomultiplier tube (PMT) is connected with a 5 µm pinhole.

The main limitation of existing two-photon volumetric optical storage systems is the detection. In fact, due to the nature of the media and the low number of emitted fluorescence photons, discriminating between a bit stimulation and background scattering is often a challenge. The PMT delivers good uniformity across medium depth and ensures a 25 dB crosstalk rejection. However, only one bit can be read at a time while the method can theoretically allow simultaneous readout of 64 independent bits in 16 tracks over 4 layers, if confocal microscopy with CCD was used. However, both a confocal microscopy and a PMT based approach are impractical due to the bulky setup, the cost and the power dissipation of the system. In addition, speed considerations are to be taken into account since PMTs and CCDs or CMOS APSs may not ensure single photon sensitivity and multi-megahertz bandwidth simultaneously.

The ability to discriminate different bits at a certain Bit Error Rate (BER) is a function of the noise present in the light beam as it is reflected by the storage carrier. The noise content in a reflected beam is characterized by Signal-to-Noise-Ratio (SNR). The BER is also a function of the ratio between the light intensity in the presence of a "1" and a "0" bit. This property is quantified by dynamic range. Every detector technology is associated with a given read-out speed, i.e. the bitrate at which a certain BER can be guaranteed. Bitrate is generally determined by the average time that a detector requires to react to reflected beam and by the resulting time uncertainty. Conventional photodetectors are generally constructed as a reverse biased photodiode. If biased far below breakdown, the diode produces a current proportional to incident light intensity, whereby one photon can only generate a single electron-hole pair. The so-generated charges accumulate at both plates of the equivalent parasitic capacitance forming across the diode and generate a voltage. The optical conversion gain is measured as such voltage per intensity and exposure time. In order to detect the arrival of a single photon using a conventional photodiode, a comparator with discrimination voltage $\Delta V < QEq/C$, where q is the charge of an electron, C the photodiode's parasitic capacitance, and QE the quantum efficiency of the detector. For example, a discrimination voltage of 100 nV would be necessary for a parasitic capacitance of 6 fF and a quantum efficiency of 40%. Assuming that it could be possible to build a comparator with infinitely good noise performance, the time uncertainty of the measurement would be excessively high. For this reason, conventional methods make a determination of the bit value based on a large number of photons generating thousands of electrons, thus resulting in voltage variations often of several millivolts and a time uncertainty of perhaps a few microseconds.

These characteristics are adequate in conventional storage systems based on reflection. However due to the inherent nature of these systems, a large number of superimposed tracks is not feasible. Two-photon volumetric optical methods may be used to read data stored in plurality of layers, thus enabling a potentially higher bit density. However, it has been found that such systems require detectors with much higher dynamic range and possibly smaller timing uncertainty.

BRIEF SUMMARY OF THE INVENTION

According to the invention, the information stored on an optical record carrier is retrieved with an array of single photon detectors (SPDs) for acquisition of an image of at least a portion of said record carrier. The image may be a 2D or 3D image, comprising a plurality of pixels captured simultaneously with an array of SPDs, or a plurality of pixels captured at different times with a single SPD or an array of SPDs, or even a single pixel, captured with a single, SPD or an array of SPDs connected to a spatial filter.

This has the advantage that a fast and effective discrimination between spatial locations in which a bit has been recorded, and spatial locations with no bits, is possible with cost-effective, possibly integrated detectors, and even with a small amount of light available.

The data storage system of the invention uses a transducer based on single photon detectors (SPDs) and volumetric optical disk storage systems to massively expand current storage capacities. The method enables the implementation of low-cost systems due to relaxed specifications of the light source in terms of power and stability. Moreover the method exhibits significant margins in the readout speeds that could be achieved in the future using coding schemes more advanced than simple on-off-keying (OOK). Finally, thanks to the benefit of miniaturization, the integration of a large number of SPDs on the same substrate will be possible, thus enabling multi-channel parallel readouts with built-in digital signal processing.

The present invention is also related to a SPAD or an array of SPADs used in a transducer for reading bi-dimensional and tridimensional information stored in an optical record carrier, for example, a compact disk, DVD, Blue-ray disk or other types of moving carrier. Use of SPAD arrays allows for a fast and precise acquisition of the pattern of pits or discontinuities in the record carrier. This allows determination only of the pits position, possibly in three dimensions, of their length and possibly their width.

Determination of the depth of the pits is also possible by using for example, time-of-flight measure. Parallel measure with several, for example two, rows of SPADs allows for simultaneous measure of several pits and for some level of redundancy which can be used for error detection and/or correction schemes. Optical transducers based on SPADs thus allow for a higher density of information and for faster reading.

DETAILED DESCRIPTION OF POSSIBLE EMBODIMENTS OF THE INVENTION

Figure 1:
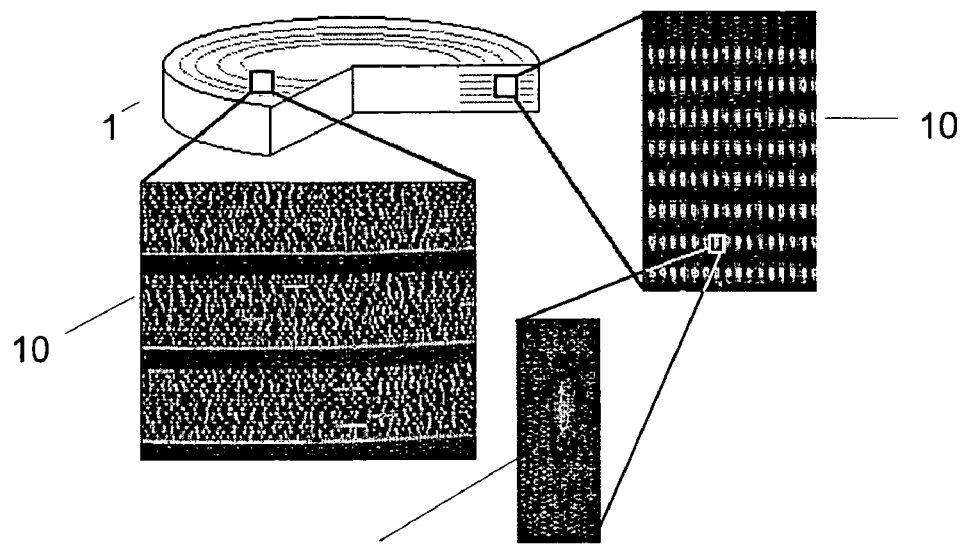
FIG. 1 is a schematic truncated view of an optical record carrier. The smaller views are images of superposed layers of bits and of an individual volume in which a bit has been recorded.
Figure 2:
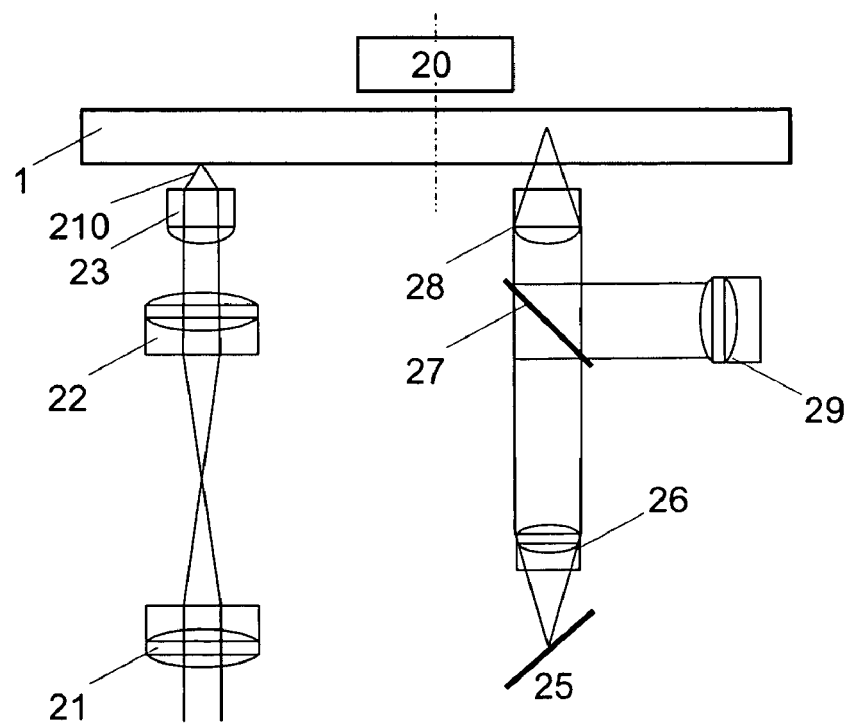
FIG. 2 is a schematic view of a storage system based on single photon detectors.

The data storage system is the invention based on the usage of a transducer including one or several solid-state SPDs for detecting discontinuities, for example pits or fluorescence emitting locations, in an optical record carrier. Discontinuities may be spread across several layers of the optical record carrier. The SPDs may possibly be associated with an optic for focusing light emitted or reflected from different locations and different depths of the carrier, and/or with time-to-digital converters (TDCs) for determining the time-of flight of the photons received from the carrier, and the depth or location of the discontinuities.

Optical record carrier may store data as pits in one or several layers, whereas the position, length, width and/or depth of the pits are used for coding the information. In the preferred embodiment illustrated in FIG. 1, bits 100 are recorded, preferably in concentric tracks 10 and across multiple layers 11 in depth, by focusing a beam of light 210 in specific 3-D locations of a molded photochromic dispersed organic polymer 1. In an embodiment, bits are written at predetermined locations of a polymer matrix dispersed with photochromic molecules at points of temporal and spatial intersection of two photons with sufficient energies to alter the structure of the photochromic material.

Bits are read by fluorescence occurring when the corresponding locations are stimulated by a suitable optical light absorbed within the recorded volume at the corresponding locations.

SPDs are characterized by a different operating mode than conventional photodiodes. Conventionally, Photomultiplying Tubes (PMTs) 25 are used as SPDs. In this case, the arrival time of a single photon can be determined with a great accuracy, perhaps a few hundreds of picoseconds, due to the inherent photomultiplication effect by which a single photon generates an avalanche of about hundreds of thousands or millions of charges. Thus, comparator's constraints for discriminating voltages at the output of the PMT are acceptable and arrival time accuracies of a few tens of picoseconds are realizable. With low photon arrival time uncertainty, fewer photons need be detected to be able to discriminate different bits with BER values of perhaps $10^{-5}$, adequate for most optical storage applications. Relaxing the number of photons that one needs to detect has two effects. The first is a possible reduction of the laser power needed to read optical media and consequently a lower optical reader apparatuses' cost. The second is a potential speed up of the read-out process and/or smaller bit dimensions (and thus higher bit density). Photomultiplying tubes are however expensive, bulky, power-consuming and thus hard to group in arrays.

According to the invention, the transducer uses one solid-state SPD, or preferably an array of solid-state SPDs, instead of a photomultiplying tube. In a preferred embodiment, the SPDs are based on Single Photon Avalanche Diodes (SPADs), capable of achieving a low arrival time uncertainty of perhaps a few tens of picoseconds at low power consumption. A detailed description of the principles of the SPAD technology can be found in the article of C. Niclass, A. Rochas, P. A. Besse, and E. Charbon, "Design and Characterization of a CMOS 3-D Image Sensor Based on Single Photon Avalanche Diodes", IEEE Journal of Solid-State Circuits, pp. 1847-1854, September 2005. SPADs exhibit high saturation intensity and low DCR, thereby achieving a large dynamic range, thus enabling one to differentiate scattering from fluorescence. SPADs also enable one to perform both tracking and data read-out using the same read-out system. The photons generated in a spatial location where a "1" bit was recorded are collected by the optics of an electro-optical setup of FIG. 5, wherein elements similar or identical to the elements of FIG. 1 are designated with the same reference numbers.

Figure 3:
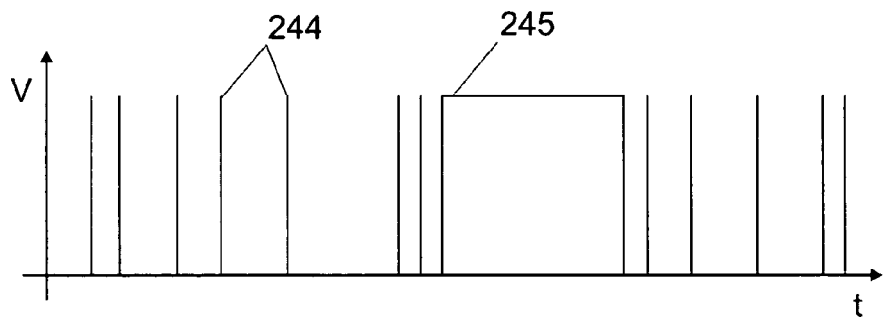
FIG. 3 is a diagram illustrating the typical voltage signal as a function of time at the output of a SPAD based transducer.

The photons are focused on the active area of the SPAD based transducer 24, thus generating a sequence of pulses 244 at the output of the read-out circuit 240 of the SPADs. This sequence of pulses represents a delayed, highly accurate map of the sequence of arrival of each photon. FIG. 3 shows a typical response measurable in a two-photon fluorescence based storage system where SPADs are being utilized. A SPAD reacts to scattering and noise producing incoherent, possibly Poisson distributed pulses 244 that cannot cause saturation. When a "1" is being observed, then the SPAD will receive a large number of photons which are spaced sufficiently near to prevent a full detection cycle or that are nearer than the average dead time. Thus, saturation is reached during time intervals 245. Detecting saturation, for example with a built-in digital signal processor (DSP) 241, is simple as it consists of simply measuring the saturation time and thresholding it.

Figure 4:
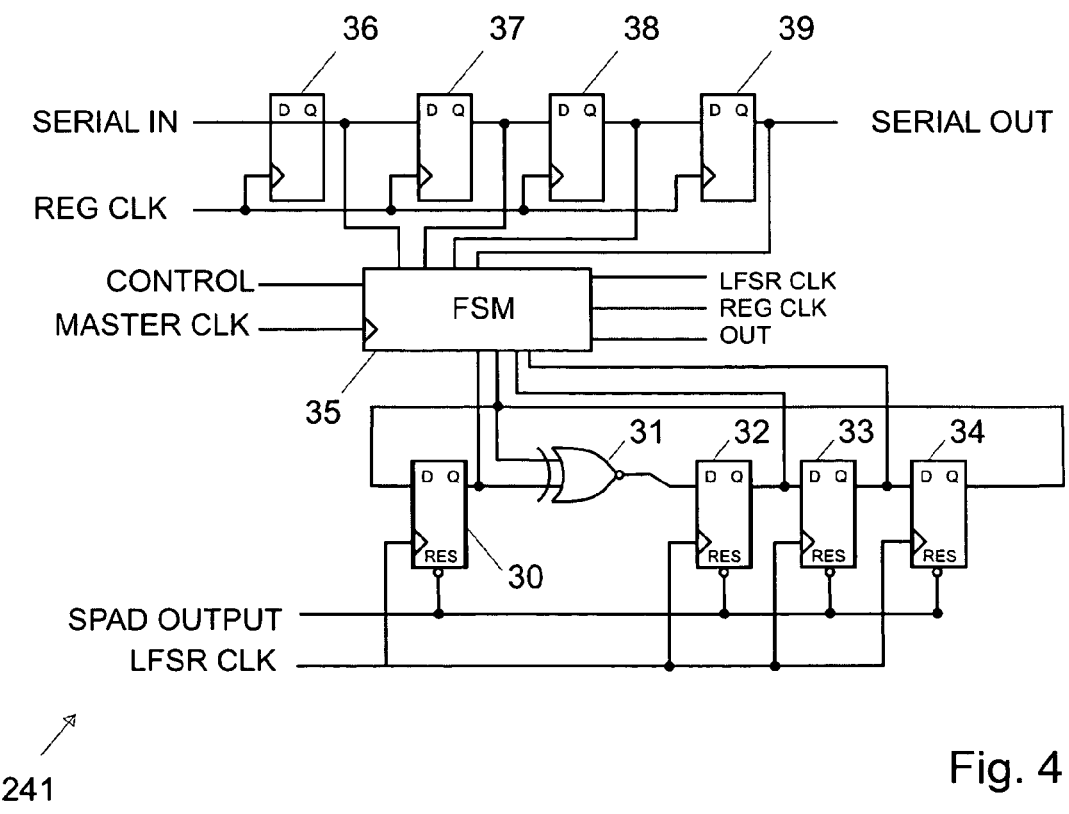
FIG. 4 shows a possible electronic circuit for processing signals output by SPADs in the transducer of the invention.

This DSP may comprise or be made up of a programmable digital filter. A possible embodiment of filter is illustrated on FIG. 4. The purpose of the filter is to separate the fluorescence signal from the noise caused by background backscattering while the light source can be a low-cost continuous laser. While optical filtering may also be used, digital filtering may be programmable, even in real-time, thus allowing great flexibility in the implementation and great performance robustness. Moreover, digital filtering allows for discrimination between bits "0" and "1", before the SPAD reaches saturation or even if it does not actually reach saturation. Note that filtering can be performed simultaneously on each pixel and be independently programmed.

The output of the digital signal processor or filter 241 may be used by a tracking system 242 for controlling the speed of rotation of the motor 20 and possibly the focusing of the light receiving optics 26, 27, 28. This output is also delivered to an output circuit 243 for retrieval by external systems. Obviously, other digital processing operations may be performed on the digital data stream output by the transducer, including error detection and correction, formatting, buffering, etc.

In addition or replacement to the temporal filtering performed by the illustrated filter 241, a spatial filtering may be performed, taking into account signal output by several adjacent SPADs in an array for reading one single bit. Thus any spatial and/or temporal discontinuity may be exploited to detect in a fast and reliable way the presence of bits. Use of signals delivered by several adjacent SPADs receiving photons emitted by the same, or by adjacent portions of the optical record carrier, may relax the conditions on the dead time of single SPAD. For example, a bit may be detected as soon as a group of n, for example 16, adjacent SPADs delivers a digital signal that fulfils a predetermined condition, as determined by the spatial filter. In a simple embodiment, the filter may perform a simple threshold operation, and deliver a signal corresponding to predetermined bit state for example when several adjacent SPADs register a simultaneous or correlated brightness change.

Moreover, advanced techniques for reducing the dead time of the SPADs may be used in order to increase the data throughput.

Figure 5:
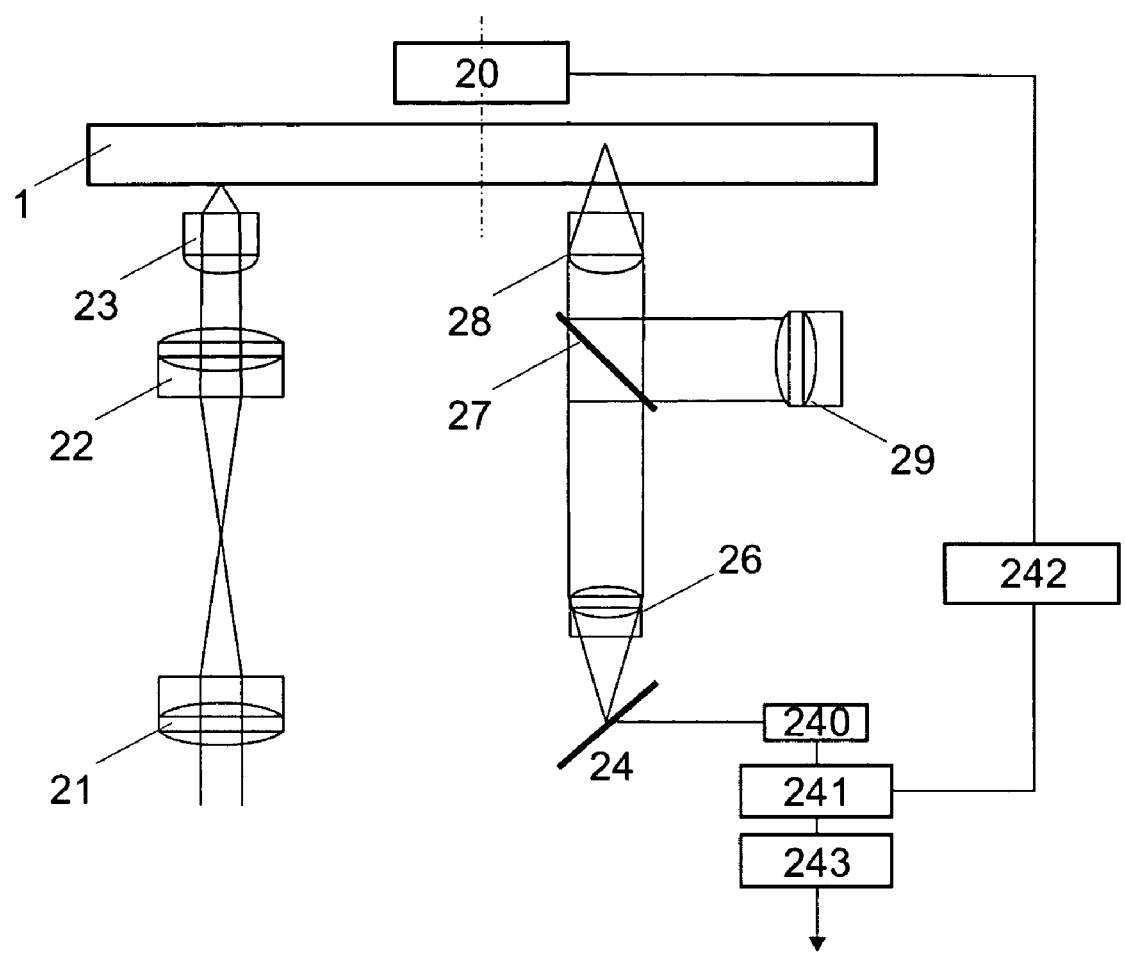
FIG. 5 is a schematic view of a storage system based on single photon detectors.

FIG. 5 evidences the simplicity of a SPAD based storage system due to the lack of mixed-signal high-performance components such as A/D converters. This is due to the fact that SPADs are inherently digital devices, with digital output. In a preferred embodiment, CMOS based SPADs are used, which may be implemented in a monolithic integrated circuit, possibly with other digital components such as the read-out circuit 240, the DSP 241 and/or the output circuit 243.

The data throughput at the output of the transducer may be increased for example by fanning the light beam projected onto the optical storing carrier with a diffraction grating, thus producing an array 1×N or even M×N of focused locations in the carrier. The resulting fluorescence light may be received by a 1×N respectively a M×N array of solid-state SPADs, possibly integrated into a single monolithic integrated circuit, thus increasing the total data throughput at reading by N respectively by M×N.

The invention claimed is:

1. A transducer for reading bits of information stored in an optical record carrier, comprising an array of solid-state single photon detector (SPDs) for acquisition of an image of at least a portion of said record carrier, wherein a plurality of single photon detectors in said array are simultaneously used for determining a value of each bit of information.

2. The transducer of claim 1, wherein said single photon detector is a single photon avalanche diode (SPAD).

3. The transducer of claim 2, said SPAD being a CMOS based SPAD.

4. The transducer of claim 3, comprising a read-out circuit at the output of said SPAD for processing signal delivered by said SPAD, said read-out circuit being mounted on a monolithic integrated circuit with said SPAD.

5. The transducer of claim 3, further comprising:
 a read-out circuit at the output of said SPAD for processing signal delivered by said SPAD,
 an electronic discrimination circuit, for discriminating between pulses emitted from active spatial locations of said optical carrier from pulses produced by scattering and/or noise
said read-out circuit and said electronic discrimination circuit being both mounted on a monolithic integrated circuit with said SPAD.

6. The transducer of claim 3, wherein detection of a single bit in said optical record carrier is based on signal output by a plurality of adjacent SPADs.

7. The transducer of claim 3, wherein detection of a single bit in said optical record carrier is based on signals delivered by a filter, without waiting for any SPAD to saturate.

8. The transducer of claim 1, comprising delay measurement means for detecting a time-of-flight of photons received from said optical record carrier.

9. The transducer of claim 8, said delay measurement means comprising time-to-digital converters.

10. A transducer for reading information stored in an optical record carrier, said transducer comprising: at least one solid-state single photon detector (SPD) for acquisition of an image of at least a portion of said optical record carrier; and
 an electronic discrimination circuit at the output of said SPAD, for discriminating between pulses emitted from active spatial locations of said optical carrier from pulses produced by scattering and/or noise.

11. The transducer of claim 10, said electronic discriminating circuit being arranged so as to produce a signal with a first value when a large number of photons is received during a time interval, and a signal with a different value when the number of photons received is not sufficient to maintain said SPAD in saturation during said interval.

12. The transducer of claim 11, said electronic discriminating circuit being mounted on a monolithic integrated circuit with said SPAD.

13. The transducer of claim 11, said electronic discriminating circuit comprising a programmable digital filter.

said read-out circuit and said electronic discrimination circuit being both mounted on a monolithic integrated circuit with said SPAD.

14. A single photon detector based storage system, comprising:
an optical record carrier storing information having bits,
a transducer with an array of solid-state single photon detectors (SPDs) for acquisition of an image of at least a portion of said record carrier,
an electronic circuit for retrieving information from said image, wherein a plurality of single photon detectors in said array are simultaneously used for determining a value of each bit of information.

15. The storage system of claim 14, wherein said single photon detectors are single photon avalanche diodes (SPADs).

16. The storage system of claim 15, further comprising:
a light source for producing a light beam on said optical record carrier,
an optical system for focusing light received from said optical record carrier on the active area of said single photon detector.

17. The storage system of claim 16, wherein said optical record carrier stores data across multiple layers in depth.

18. The storage system of claim 17, said light source being arranged so as to focus a beam of light in a specific 3D volume of said optical record carrier.

19. The storage system of claim 14, wherein data is recorded in said optical record carrier as fluorescence generating volumes.

20. The storage system of claim 14, wherein said optical record carrier is made up of a photochromic polymer material,
wherein bits are written in the volume of said optical record carrier at predetermined spatial locations,
and wherein recorded bits are read by fluorescence when excited by photons emitted by a light source.

21. The storage system of claim 20, wherein said single photon detector detects photons emitted by fluorescence at said spatial locations when said locations are excited by a light source.

22. The storage system of claim 14, wherein said locations are spread across several layers in said optical record carrier.

23. The storage system of claim 14, further comprising:
an electronic discrimination circuit, for discriminating between pulses received from said optical carrier that are emitted from active spatial locations from pulses produced by scattering and/or noise.

24. The storage system of claim 23, further comprising a tracking system for controlling the motor driving said optical record carrier,
said tracking system being commanded by the output of said electronic circuit.

25. The storage circuit of claim 24, wherein detection of single bits is based on signal output by a plurality of SPADs in an array.

26. The storage circuit of claim 24, wherein detection of single bits is based on signals delivered by a filter before saturation of said SPADs.

27. An optical disk reader based on single photon detector, comprising:
a transducer with an array of one solid-state single photon avalanche diodes (SPADs) for delivering digital pulses when photons are received from said optical disk,
a spatial and/or temporal filter for detecting one bit when digital pulses delivered by said SPADs fulfill predefined spatial and/or temporal conditions, whereas the detection of each bit depends on digital pulses delivered by a plurality of the SPADs.

28. A method for reading data from an optical record carrier storing bits, wherein the bits are recorded in said optical carrier at predetermined spatial locations in several layers, comprising the steps of:
illuminating at least a portion of said optical record carrier with a light source;
receiving on at feast one solid-state single photon detector photons emitted by fluorescence when said spatial locations are excited by said light source;
discriminating at the output of said single photon detector between signal produced by said spatial locations and signal produced by scattering and/or noise.

29. The method of claim 28, said single photon detector comprising one single photon avalanche diode (SPAD).

30. The method of claim 29, said discriminating step comprising:
distinguishing between time intervals when said SPAD saturates and time intervals where said SPAD does not saturate.

31. A transducer for reading information stored in an optical record carrier, comprising at least one solid-state single photon detector (SPD) for acquisition of an image of at least a portion of said record carrier, and delay measurement means for detecting a time-of-flight of photons received from said optical record carrier.

32. A single photon detector based storage system, comprising:
an optical record carrier,
a transducer with at least one solid-state single photon detector (SPD) for acquisition of an image of at least a portion of said record carrier,
an electronic circuit for retrieving information from said image, and
delay measurement means for detecting a time-of-flight of photons received from said optical record carrier.

* * * * *